(12) United States Patent
Le Besnerais

(10) Patent No.: US 8,952,582 B2
(45) Date of Patent: Feb. 10, 2015

(54) STATOR ARRANGEMENT HAVING A COOLING DEVICE INCORPORATING A HEAT PIPE

(75) Inventor: Jean Le Besnerais, Mons en Baroeul (FR)

(73) Assignee: Siemens Aktiengesellschaft, München (DE)

( * ) Notice: Subject to any disclaimer, the term of this patent is extended or adjusted under 35 U.S.C. 154(b) by 79 days.

(21) Appl. No.: 13/429,829

(22) Filed: Mar. 26, 2012

(65) Prior Publication Data

US 2012/0256502 A1     Oct. 11, 2012

(30) Foreign Application Priority Data

Apr. 7, 2011 (EP) .................................. 11161518

(51) Int. Cl.
*H02K 9/22* (2006.01)
*H02K 5/20* (2006.01)
*H02K 9/20* (2006.01)
*H02K 9/02* (2006.01)

(52) U.S. Cl.
CPC .. *H02K 9/20* (2013.01); *H02K 9/02* (2013.01); *Y02E 20/14* (2013.01)
USPC ................ 310/64; 310/52; 310/54; 310/55; 310/60 A

(58) Field of Classification Search
CPC .................................. H02K 9/22; H02K 5/20
USPC ................ 310/52, 54, 55, 60 A, 64
See application file for complete search history.

(56) References Cited

U.S. PATENT DOCUMENTS

| 3,801,843 | A | * | 4/1974 | Corman et al. .................. 310/52 |
| 6,091,168 | A | * | 7/2000 | Halsey et al. .......... 310/216.107 |
| 7,635,932 | B2 | * | 12/2009 | Matin et al. ...................... 310/58 |
| 2004/0155539 | A1 | * | 8/2004 | Potoradi et al. .................. 310/58 |
| 2004/0253130 | A1 | * | 12/2004 | Sauciuc et al. ................ 417/436 |
| 2008/0067882 | A1 | * | 3/2008 | Murata ........................... 310/54 |
| 2010/0072854 | A1 | * | 3/2010 | Stiesdal ................ 310/216.113 |

FOREIGN PATENT DOCUMENTS

| EP | 1432102 A2 | 6/2004 |
| GB | 1470083 A | 4/1977 |
| JP | 60124269 A | 7/1985 |
| JP | 2079746 A | 3/1990 |

* cited by examiner

*Primary Examiner* — Terrance Kenerly

(57) ABSTRACT

A stator arrangement for an electrical machine includes a stator having a stator stack consisting of a plurality of axially adjacently disposed metal plates. The arrangement further includes a cooling device in the shape of at least one heat pipe. The at least one radial channel extends between respective axially adjacently disposed metal plates, wherein the at least one heat pipe is located within the at least one radial channel.

9 Claims, 2 Drawing Sheets

STATOR ARRANGEMENT HAVING A COOLING DEVICE INCORPORATING A HEAT PIPE

CROSS REFERENCE TO RELATED APPLICATIONS

This application claims priority of European Patent Office application No. 11161518.3 EP filed Apr. 7, 2011. All of the applications are incorporated by reference herein in their entirety.

FIELD OF INVENTION

The invention refers to a stator arrangement for an electrical machine, comprising a stator having a stator stack consisting of a number of axially adjacently disposed metal plates, and a cooling means in the shape of at least one heat pipe, whereby at least one radial channel extends between respective axially adjacently disposed metal plates.

BACKGROUND OF INVENTION

The operation of electrical machines such as generators or the like having a respective stator arrangement is accompanied by heat losses or copper losses respectively. In order to avoid thermal overheating which would lead to lowered efficiency or even to damage or a reduction of the lifetime, particularly the insulation lifetime, of the electrical machine, usually cooling means are provided with the stator arrangement.

Lastly, attempts have been made to use heat pipes as cooling means, i.e. the respective electrical machines are cooled on the basis of an evaporative cooling principle.

EP 1 852 956 A1 refers to an electrical machine having an electrical conductor formed by coils that are wound and formed continuously in hollow profiles. A continuous cooling channel and a continuous electrical conductor are formed within the coils. The hollow profiles are supplied with a refrigerant. The refrigerant is operated with respective low temperature and flow rate for cooling such that the refrigerant is partially evaporated when the refrigerant partially flows through the hollow profiles.

Hence, EP 1 852 056 A1 proposes to use a cooling means in the shape of heat pipes in order to provide the electrical machine with appropriate cooling.

However, the known principles using heat pipes in order to provide cooling of respective stator arrangements are not satisfying.

SUMMARY OF INVENTION

Hence, it is the object of the present invention to provide a respective stator arrangement having improved cooling properties.

This is inventively achieved by a stator arrangement as has been initially described, wherein the at least one heat pipe is located within the at least one radial channel.

The present invention suggests placing heat pipes directly in the respective radial channels within the stator stack and accordingly, at given axial positions between the respective metal plates of the stator stack. Thus, the inventive principle allows to bring the cooling means in the shape of respective heat pipes in the most possible close contact to the stator stack, i.e. an enhancement of the contact area between the respective heat pipe and the stator stack resulting in better cooling capability and cooling efficiency respectively. Any other cooling means such as passive or liquid cooling means are not required.

With the use of heat pipes as cooling means, the inventive principle is based on the general principle of an evaporative cooling.

Due to the inventive disposal of the respective heat pipes radially extending through the stator stack, the stator stack, i.e. respective hot portions of the stator stack serve as the heat source, whereas respective colder portions of the stator stack may serve as the heat sink for instance. Particularly, respective heat or copper losses within the stator stack serve as the heat source, whereas the ambient air surrounding the stator stack or a cooling gas circulating along the stator stack serves as the heat sink.

Generally, the inventive principle is applicable both for outer stator—inner rotor configurations of electrical machines, i.e. configurations with the stator arrangement having a radially outer position compared to the rotor, and outer rotor—inner stator configurations, i.e. configurations with the rotor having a radially outer position compared to the stator arrangement.

The concrete number of installed heat pipes may vary and mainly depends on diverse factors like working conditions of the generator comprising the inventive stator arrangement, axial dimensions of the stator arrangement, temperature distribution and temperature gradients within the stator stack, etc.

As is known, the functional principle of heat pipes is based on a working fluid such as carbon dioxide ($CO_2$), ethanol ($C_2H_5OH$), etc. contain to within a certain volume of the heat pipe. The liquid phase of the respective working fluid is brought in contact with a heat source leading to an evaporation of the working fluid, i.e. the working fluid turns to its gaseous phase, thereby absorbing heat from the heat source. The gaseous phase of the working fluid condenses back into the liquid phase when contacting a heat sink, whereby the latent heat of the gaseous phase of the working fluid is released. The cooling cycle continues in that the liquid phase returns to the hot interface by capillary or gravity action for instance.

The internal pressure within the respective heat pipe is generally comparatively low, i.e. vacuum pressure is applied. In order to facilitate the phase change of the working fluid in dependence of given working conditions, the internal pressure of the heat pipe may be appropriately adapted.

The course and/or orientation of the heat pipe is mainly defined by the respective course and/or orientation of the respective radial channels within the stator stack. Thereby, the term radial channel also refers to channels having an inclined course and/or orientation, i.e. the respective heat pipes may also be aligned with a certain inclined orientation.

However, it is preferred that the at least one heat pipe radially extends through the stator stack. Accordingly, it is advisable to vertically align the respective heat pipe which is of advantage in view of its cooling efficiency since the respective circulation of the respective phases of the working fluid is optimised improving the cooling properties of the heat pipe as a whole.

The at least one heat pipe may project off the stator stack. Hence, a respective radially outer or inner portion of the heat pipe is freely exposed to the heat sink, i.e. ambient air, a cooling gas or the like which further improves the efficiency of the respective heat pipe mainly due to the fact that the temperature gradient between the heat source and the heat sink is increased.

With respect to the respective outer stator—inner rotor configuration and outer rotor—inner stator configuration of a respective electrical machine comprising an inventive stator arrangement, the heat pipes radially project in inward or outward direction.

In a preferred embodiment of the invention, the at least one heat pipe comprises at least two portions of different thermal conductive properties. In such a manner, the cooling efficiency of the heat pipe may be further increased due to the different respective thermal conductive behaviour of the respective portions of the heat pipe. As an example, the different thermal conductive behaviour may be achieved in that the first portion of the heat pipe is built of copper and the second portion of the heat pipe is built of aluminium or iron. It is possible to divide the respective portions by means of a separation layer or the like.

Aside, it is thinkable to divide the heat pipe in more than two portions of different thermal conductive behaviour. Of course, the respective portions are firmly and especially leakproof connected to each other.

The respective metal plates defining the radial channel may be at least partially adapted to the shape of the respective heat pipe. In such a manner, first, the contact area between the stator stack and the respective heat pipe may be further enhanced leading to better cooling properties. Second, the respective metal plates defining the respective radial channel may also serve as a connecting means for the respective heat pipes in terms of a form closure, that is the respective metal plates may support the respective heat pipes by a press fit or the like.

In order to further increase the cooling efficiency of the heat pipe, it is thinkable that the heat pipe is provided with at least one cooling fin. The at least one cooling fin is preferably disposed at the respective portion of the heat pipe allocated to the heat sink. Of course, the respective portion of the heat pipe is preferably provided with an appropriate number of respective cooling fins.

It is of advantage when the heat pipe is a flat heat pipe. Flat heat pipes comprise a planar, essentially two-dimensional, sheet-like shape, hence they are ready to be inserted in very close radial channels between the respective metal plates of the stator stack. By the provision of the respective heat pipes as flat heat pipes, the axial dimensions of the stator arrangement do not have to be elongated leading to a compact constructive design of the stator arrangement as a whole.

Besides, the invention relates to an electric machine, particularly a generator for a direct drive wind turbine, comprising a stator arrangement as has been described before.

BRIEF DESCRIPTION OF THE DRAWINGS

In the following, the invention is explained in detail as reference is made to the figures, whereby.

DETAILED DESCRIPTION OF INVENTION

Figure 1:
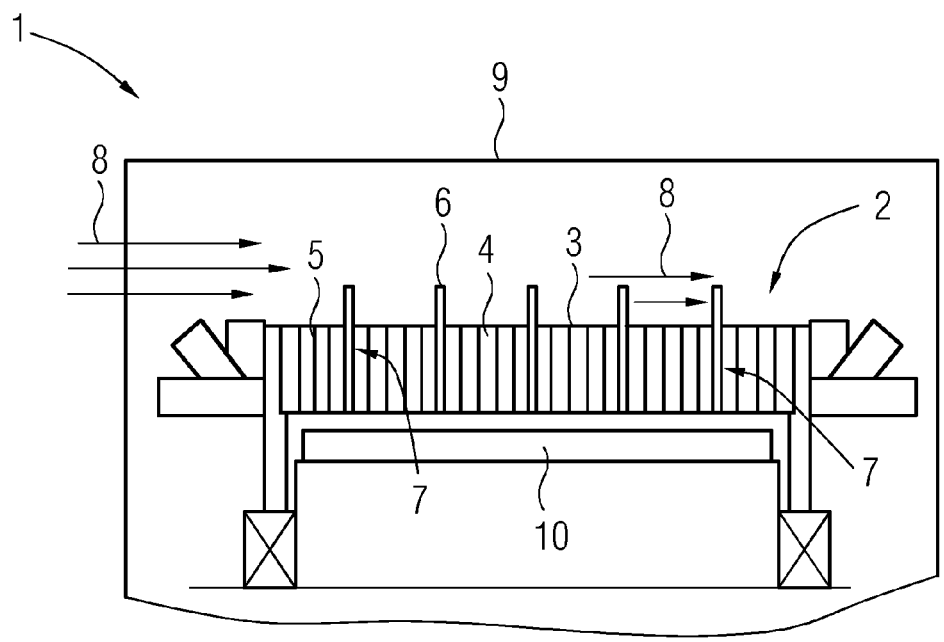
FIG. 1 shows a principle cut view of an electrical machine, comprising an inventive stator arrangement according to an exemplary embodiment of the invention.

FIG. 1 shows a principle cut view of an electrical machine 1 comprising an inventive stator arrangement 2 according to an exemplary embodiment of the invention. The electrical machine 1 is a generator installed in a direct drive wind turbine for offshore applications (not shown) for instance.

The stator arrangement 2 comprises a stator 3 having a stator stack 4 consisting of a number of axially adjacently disposed metal plates 5. In order to provide the stator 3 and the stator stack 4 respectively with appropriate cooling, cooling means in the shape of several heat pipes 6 are provided within respective radial channels 7 in the stator stack 4.

As is discernible, the heat pipes 6 radially extend through the stator stack 4, i.e. the heat pipes 6 are disposed between respective groups of metal plates 5. Thus, the inventive principle uses the respective radial channels 7 as slots for accommodating the respective heat pipes 6, whereas in conventional air-cooled electrical machine the radial channels 7 generally serve as air-ducts.

Figure 2:
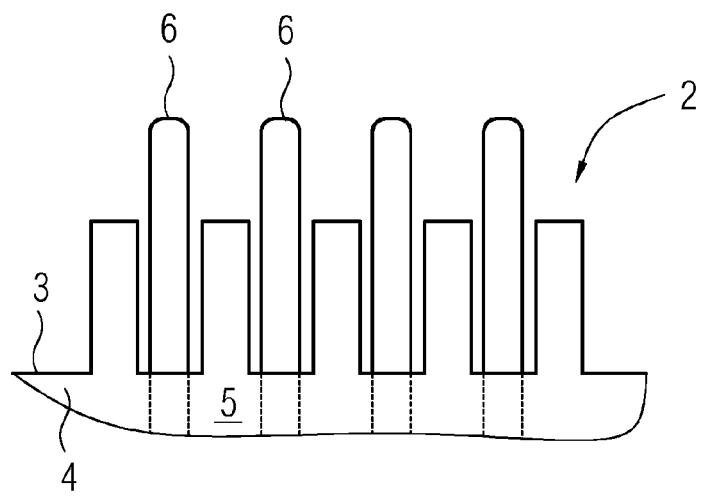
FIG. 2 shows a principle frontal view of a stator arrangement according to an exemplary embodiment of the invention.

Since the respective radially outer portions of the heat pipes 6 radially project off the stator stack 4, the stator stack 4 acts as the heat source and the air (indicated by arrows 8) surrounding and circulating respectively along the stator stack 4 acts as the heat sink of the respective heat pipes 6. Thus, the heat pipes 6 serve as a thermal shortcut from the stator stack 4 to the ambient air. Accordingly, the cooling efficiency of the heat pipes 6 also depends on the wind conditions in the area of the wind turbine comprising the electrical machine 1. That is, high wind speeds lead to high cooling efficiency of the heat pipes 6 since the amount of thermal energy dragged off the respective radially outer portions of the heat pipes 6 is increased in this case (cf. also the frontal view of the stator arrangement 2 depicted in FIG. 2).

Of course, respective openings are provided in the housing 9 of the electrical machine 1 in order to allow the wind to stream along the stator stack 4 and the respective portions of the heat pipes 6 radially projecting off the stator stack 4.

Although the electrical machine 1 depicted in FIG. 1 comprises an outer stator 3 —inner rotor 10 configuration, the inventive principle also applies to respective electrical machines 1 comprising an outer rotor 10—inner stator 3 configuration. In this case, the heat pipes 6 project in radially inward direction off the stator stack 4, i.e. the heat sink is provided by air blown along the radial inner side of the stator stack 4. Of course, respective fans (not shown) are provided within the housing 9 of the electrical machine 1 in this case.

The heat pipes 6 are preferably of the flat type, i.e. comprise a sheet-like, planar, essentially two-dimensional structure. Hence, the inventive principle using heat pipes 6 allows a significant reduction of the axial dimensions or axial length respectively of the stator arrangement 2. However, tubular structures of heat pipes may also be used (cf. FIG. 2). Generally, further cooling means like passive or liquid cooling means are not required.

Figure 3:
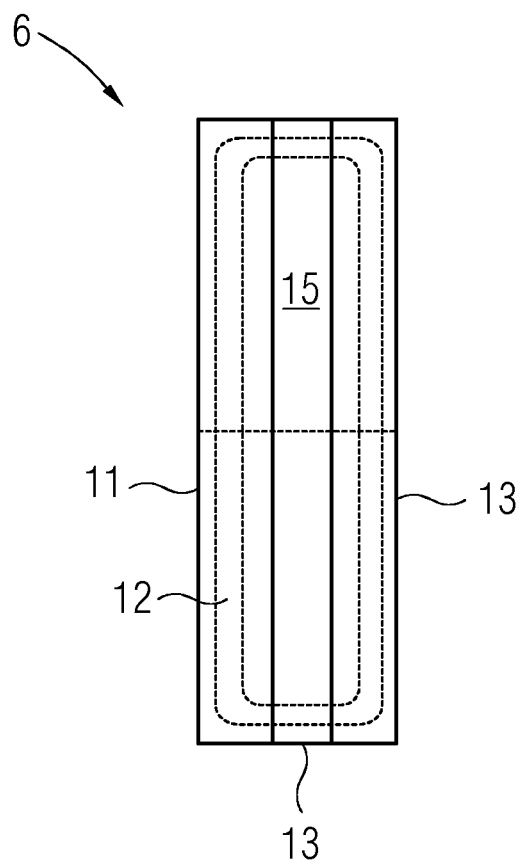
FIG. 3 shows a principle view of a flat heat pipe according to an exemplary embodiment of the invention.

FIG. 3 shows a principle view of a flat heat pipe 6 according to an exemplary embodiment of the invention. As is discernible, the heat pipe 6 comprises a multi-layer structure comprising a vapour plate 11 having a respective channel-like recess 12 for the gaseous phase of a working fluid of the heat pipe 6 such as carbon dioxide ($CO_2$), a separation plate 13 adjacently disposed to the vapour plate 12 and a liquid plate 14 adjacently disposed to the separation plate 13 having a respective recess 15 for the liquid phase of the working fluid of the heat pipes 6. The functional principle of a heat pipe 6 has shortly been mentioned above, there is no need for repetition at this point.

The heat pipe 6 preferably comprises two portions of different thermal conductive properties. With respect to FIG. 3, the lower half of the heat pipe 6 is built of copper, whereas the upper half of the heat pipe 6 is built of iron. In such a manner, the cooling efficiency of the heat pipe 8 may be enhanced. With building the respective portions or halves of the heat pipe 6 with other suitable they conductive materials, an individually adapted cooling behaviour of the heat pipe 6 may be attained.

Although not depicted in the figures, the heat pipe 6 may comprise a number of cooling fins. The cooling fins improve thermal exchange due to an enlarged surface area of the heat pipe 6 and further enhance the cooling properties. The cooling fins are preferably at least partially provided at the respective portion of the heat pipes 8 allocated to the heat sink, i.e. ambient air or a gaseous cooling medium circulating through the housing 9 of the electrical machine 1.

It is possible that the stator 3 of the electrical machine 1 is segmented in respective stator segments (not shown).

Figure 4:
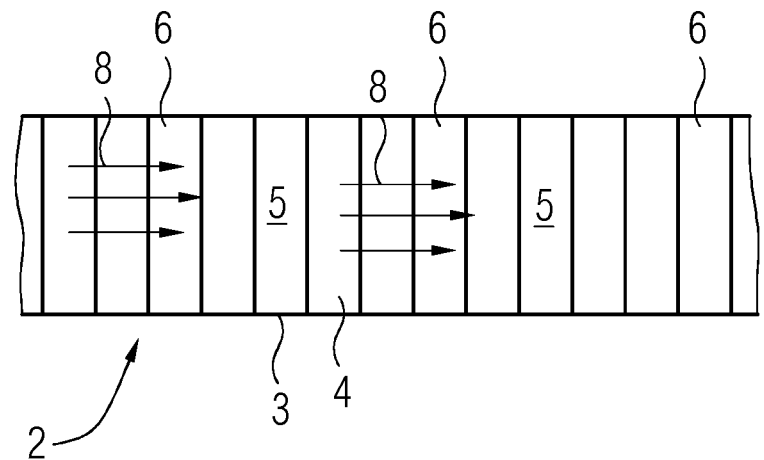
FIG. 4 shows a principle top view of a portion of the stator arrangement according to an exemplary embodiment of the invention.

FIG. 4 shows a principle top view of a portion of a stator arrangement 2 according to an exemplary embodiment of the invention. As is discernible, the heat pipe 6 is directly placed in between respective metal plates 5 defining the radial channels 7. Thereby, it is possible to provide a firm allocation of the heat pipe 6 by means of a form closure, i.e. a press fit. Hence, the metal plates 5 of the stator stack 4 apply a certain axial force on the heat pipe 6 which has a planar geometrical shape, basically corresponding to the shape of the respective metal plates 5.

The invention claimed is:

1. An electrical machine comprising:
  a stator arrangement comprising:
    a stator having a stator stack comprising a plurality of axially adjacently disposed metal plates, and
    a cooling device in the shape of at least one heat pipe, wherein the at least one heat pipe is shaped to be inserted between a pair of adjacently disposed metal plates of the stator stack,
    wherein the stator stack is configured as a heat source and a cooling medium surrounding the stator stack and circulating through a housing of the electrical machine is configured as a heat sink of the heat pipe,
    wherein the heat pipe is provided with at least one cooling fin, the at least one fin providing an enlarged area at the respective portion of the heat pipe allocated to the heat sink,
    wherein the at least one heat pipe comprises at least two portions of different thermal conductive properties, and
    wherein the electrical machine is a generator for a direct drive wind turbine.

2. The electrical machine according to claim 1, wherein the at least one heat pipe radially extends through the stator stack.

3. The electrical machine according to claim 1, wherein the at least one heat pipe projects off the stator stack.

4. The electrical machine according to claim 1, wherein a first portion is built of copper and the second portion is built of iron.

5. The electrical machine according to claim 1, wherein the pair of adjacently disposed metal plates are at least partially adapted to the shape of the respective heat pipe.

6. The electrical machine according to claim 1, wherein the heat pipe is a planar heat pipe.

7. An electrical machine comprising:
  a stator arrangement comprising:
    a stator having a stator stack comprising a plurality of axially adjacently disposed metal plates, and
    a cooling device in the shape of at least one heat pipe, wherein the at least one heat pipe is shaped to be inserted between a pair of adjacently disposed metal plates of the stator stack,
    wherein the stator stack is configured as a heat source and a cooling medium surrounding the stator stack and circulating through a housing of the electrical machine is configured as a heat sink of the heat pipe,
    wherein the heat pipe is provided with at least one cooling fin, the at least one fin providing an enlarged area at the respective portion of the heat pipe allocated to the heat sink,
    wherein the at least one heat pipe comprises at least two portions of different thermal conductive properties, and
  wherein the at least two portions of differing thermal conductive properties are divided by a separating layer.

8. An electrical machine comprising:
  a stator arrangement comprising:
    a stator having a stator stack comprising a plurality of axially adjacently disposed metal plates, and
    a cooling device in the shape of at least one heat pipe, wherein the at least one heat pipe is shaped to be inserted between a pair of adjacently disposed metal plates of the stator stack,
    wherein the stator stack is configured as a heat source and a cooling medium surrounding the stator stack and circulating through a housing of the electrical machine is configured as a heat sink of the heat pipe,
    wherein the heat pipe is provided with at least one cooling fin, the at least one fin providing an enlarged area at the respective portion of the heat pipe allocated to the heat sink,
    wherein the at least one heat pipe comprises at least two portions of different thermal conductive properties,
  wherein the heat pipe has a rectangular planar shape and comprises a multi-layer structure comprising:
  a vapour plate having a respective channel-like recess for a gaseous phase of a working fluid of the heat pipe,
  a separation plate adjacently disposed to the vapour plate, and
  a liquid plate adjacently disposed to the separation plate having a respective recess for a liquid phase of the working fluid of the heat pipe.

9. An electrical machine comprising:
  a stator arrangement comprising:
    a stator having a stator stack comprising a plurality of axially adjacently disposed metal plates, and
    a cooling device in the shape of at least one heat pipe, wherein the at least one heat pipe is shaped to be inserted between a pair of adjacently disposed metal plates of the stator stack,
    wherein the stator stack is configured as a heat source and a cooling medium surrounding the stator stack and circulating through a housing of the electrical machine is configured as a heat sink of the heat pipe,
    wherein the heat pipe is provided with at least one cooling fin, the at least one fin providing an enlarged area at the respective portion of the heat pipe allocated to the heat sink,
    wherein the at least one heat pipe comprises at least two portions of different thermal conductive properties, and
  wherein a first portion of the at least two portions allocated to the heat source has a higher thermal conductivity than a second portion of the at least two portions allocated to the heat sink.

* * * * *